Patented Dec. 28, 1948

2,457,656

UNITED STATES PATENT OFFICE 2,457,656

ALIPHATIC AMINO ALCOHOLS AND MEDICINAL PREPARATIONS THEREOF

Horace T. F. Givens, East Orange, and Robert M. Herbst, Short Hills, N. J., assignors to E. Bilhuber, Inc., Orange, N. J., a corporation of New Jersey No Drawing. Application September 25, 1945, Serial No. 618,579

4 Claims. (Cl. 260—584)

Our invention relates to new and therapeutically useful aliphatic amino alcohols and medicinal preparations thereof, and more particularly to the amino alcohols having the following structural formula:

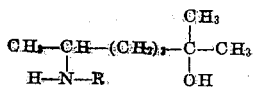

and to medicinal preparations containing the same as an active therapeutic ingredient, wherein R may be hydrogen or an alkyl radical selected from the group having one to five carbon atoms in a straight or branched chain or an alkenyl radical or an aralykl radical or a cycloalkyl radical.

The aforesaid amino alcohols of our invention have been found to be particularly valuable as therapeutic agents. They are effective pressor agents causing elevation of the blood pressure and are characterized especially by their stimulating action upon the heart. Their effectiveness and therapeutic usefulness is further enhanced by an unusually low toxicity which sharply differentiates them from the commonly employed pressor drugs. The physiological effects of these new agents are evidenced upon parenteral, oral or topical application.

These new amino alcohols may be suitably prepared as follows: When R is hydrogen, by the catalytic hydrogenation of the oxime of the corresponding ketoalcohol; or when R is a group other than hydrogen, by condensing the proper ketoalcohol with the appropriate primary amine and reducing or partially reducing the resulting imino compound or by addition of the elements of water to the double bond of the appropriate unsaturated secondary amine as illustrated by the examples cited below.

These new amino alcohols are colorless liquids of characteristic faint odor exhibiting varying degrees of viscosity. They generally exhibit solubility in water and the common organic solvents. Water-soluble salts with both organic and inorganic acids are readily formed and the aqueous solutions of these salts are particularly useful in the therapeutic application of the amino alcohols. It may be noted that the amino alcohols described by the above formula contain within their structure a single asymmetric carbon atom and that they are therefore resolvable into their optically active forms by suitable chemical methods.

The following examples are cited as illustrations of the procedures employed in the preparation of various specific amino alcohols embraced by the general structural formula given above:

EXAMPLE I 2-amino-6-methyl-6-hydroxy heptane

One-tenth mole of 6-methyl-6-hydroxy heptanone-2 oxime is dissolved in 100 cc. of water and the solution treated with 0.1 mole of hydrochloric acid and 0.4 g of platinum oxide catalyst. The oxime is hydrogenated at room temperature by agitating in an atmosphere of hydrogen at an initial pressure of 50 lbs. per square inch. Upon complete reduction of the oxime, the catalyst is removed by filtration. The product is separated from the aqueous solution after neutralization of the acid by the addition of inorganic salts and extraction with ether. Upon fractionation of the ether solution, 2-amino-6-methyl-6-hydroxy heptane is obtained as a colorless liquid boiling at 92–93° C. at approximately 7 mm. of mercury pressure.

EXAMPLE II 2-methylamino-6-methyl-6-hydroxy heptane

One part of 2-methylamino-6-methyl heptene-5 is mixed with two parts of water and the mixture is made distinctly acid by the addition of mineral acids whereupon the unsaturated amine dissolves completely. The resulting solution is heated under reflux for half an hour, cooled to room temperature and treated with sufficient caustic soda to make the mixture strongly alkaline. The product separates as an oil which is easily removed by extraction. Upon distillation of the oil, 2-methylamino-6-methyl-6-hydroxy heptane is obtained as a colorless, viscous liquid boiling at 101–103° C. at approximately 9 mm. of mercury pressure.

EXAMPLE III 2-allylamino-6-methyl-6-hydroxy heptane 0.5 mole of 6-methyl-6-hydroxy heptanone-2 and 0.55 mole of allyl amine are caused to react by dissolving in a mixture of 200 cc. of alcohol and 300 cc. of water and partially reducing with 1.5 moles of activated aluminum. Upon completion of the reaction, the product is separated by extraction with ether. Upon distillation of the ether solution, 2-allylamino-6-methyl-6-hydroxy heptane is obtained as a colorless liquid boiling at 114–116° C. at approximately 12 mm. of mercury pressure.

EXAMPLE IV

2-ethylamino-6-methyl-6-hydroxy heptane 0.5 mole of 6-methyl-6-hydroxy heptanone-2 and 0.55 mole of ethylamine are caused to react by dissolving in a mixture of 200 cc. of alcohol and 300 cc. of water and reducing the resulting imino compound with 1.5 moles of activated aluminum. Upon completion of the reaction, the product is separated by extraction with ether. Upon distillation of the ether solution, 2-ethylamino-6-methyl-6-hydroxy heptane is obtained as a colorless liquid boiling at 102°–104° C. at approximately 9 mm. of mercury pressure.

By application of the methods described in the above examples to the appropriate oxime or to the proper unsaturated secondary amine or to mixtures of the appropriate primary amine and 6-methyl-6-hydroxy heptanone-2, the following new amino alcohols of this group have been prepared:

|  | B. P. | Hg Pressure |
|---|---|---|
|  | °C. | Mm. |
| 2-amino-6-methyl-6-hydroxy heptane | 92–93 | 7 |
| 2-methylamino-6-methyl-6-hydroxy heptane | 101–103 | 9 |
| 2-ethylamino-6-methyl-6-hydroxy heptane | 102–104 | 9 |
| 2-isopropylamino-6-methyl-6-hydroxy heptane | 97–99 | 8 |
| 2-isoamylamino-6-methyl-6-hydroxy heptane | 114–120 | 7 |
| 2-allylamino-6-methyl-6-hydroxy heptane | 114–116 | 12 |
| 2-cyclohexylamino-6-methyl-6-hydroxy heptane | 141–142 | 9 |
| 2-benzylamino-6-methyl-6-hydroxy heptane | 160–162 | 8 |

The following examples are illustrative of the preparation of salts of the above compounds, and also of the compounding of medicinal agents containing these salts as active therapeutic ingredients of the character above stated:

EXAMPLE V

2-methylamino-6-methyl-6-hydroxy- heptane mucate 2 moles of 2-methylamino-6-methyl-6-hydroxy heptane and 1 mole of mucic acid are mixed in twice their weight of absolute methanol and the mixture warmed on a water bath until solution results. Upon cooling, the 2-methylamino-6-methyl-6-hydroxy heptane mucate crystallizes. M. P. 161–162° C.

EXAMPLE VI

Preparation of tablets of 2-methylamino-6-methyl-6-hydroxy heptane mucate

One-half kilogram of 2-methylamino-6-methyl-6-hydroxy heptane mucate is intimately mixed with 0.8 kilogram of milk sugar and granulated with 70% isopropyl alcohol. After drying, the granulation may be pressed into tablets of suitable size and shape for therapeutic use, for example, to contain 130 mgm. (2 grs.) of the salt which is equivalent to approximately 78 mgm. (1⅕ grs.) of the free base.

EXAMPLE VII

Solution of 2-methylamino-6-methyl-6-hydroxy heptane hydrochloride

One mole of 2-methylamino-6-methyl-6-hydroxy heptane and 1 mole of hydrochloric acid are dissolved in sufficient distilled water to make a total volume of 1955 cc. This gives a 10% solution of 2-methylamino-6-methyl-6-hydroxy heptane hydrochloride which is used orally or placed in ampules and after sterilization by heating under pressure for 30 minutes, is used parenterally.

EXAMPLE VIII

Solution of 2-methylamino-6-methyl-6-hydroxy heptane sulfate

One mole of 2-methylamino-6-methyl-6-hydroxy heptane and 0.5 mole of sulfuric acid are dissolved in sufficient distilled water to give a total volume of 2080 cc. This results in a 10% solution of 2-methylamino-6-methyl-6-hydroxy heptane sulfate which is used orally or after proper sterilization as described in Example VII is used parenterally.

EXAMPLE IX 100 grams of 2-methylamino-6-methyl-6-hydroxy heptane is dissolved in sufficient 20% alcohol to make 1000 cc. This gives a solution which contains 0.1 gm. per cc. and is suitable for oral administration.

EXAMPLE X 100 grams of 2-methylamino-6-methyl-6-hydroxy heptane is dissolved in sufficient vegetable oil, such as peanut oil, to make 1000 cc. This gives a solution which contains 0.1 gm. of the base in one cc. and is suitable for oral use or topical application.

We claim:

1. The therapeutically useful amino alcohols of the formula $$CH_3-CH-(CH_2)_3-\underset{\underset{OH}{|}}{\overset{\overset{CH_3}{|}}{C}}-CH_3$$
$$\underset{H-N-R}{|}$$

Wherein R is a radical selected from the groups consisting of hydrogen, alkyl radicals having from one to five carbon atoms, lower alkenyl, cycloalkyl and aralkyl radicals.

2. The therapeutically useful amino alcohol, 2-methylamino-6-methyl-6-hydroxy heptane.

3. The therapeutically useful amino alcohol, 2-amino-6-methyl-6-hydroxy heptane.

4. The therapeutically useful amino alcohol, 2-ethylamino-6-methyl-6-hydroxy heptane.

HORACE T. F. GIVENS.
ROBERT M. HERBST.

REFERENCES CITED

The following references are of record in the file of this patent:

Campbell et al. J. Amer. Chem. Soc. 60 1372–1376 (1938).

Rohrmann et al. J. Amer. Chem. Soc. 66 1516–1520 (1944).